(12) United States Patent
Nagels et al.

(10) Patent No.: US 9,101,099 B2
(45) Date of Patent: Aug. 11, 2015

(54) HYDROPONIC GROWING SYSTEM

(71) Applicants: Bryce D. Nagels, Verdun (CA); Robert G. Dickie, King City (CA)

(72) Inventors: Bryce D. Nagels, Verdun (CA); Robert G. Dickie, King City (CA)

(73) Assignee: Bryce D. Nagels, Verdun, Quebec (CA)

( * ) Notice: Subject to any disclaimer, the term of this patent is extended or adjusted under 35 U.S.C. 154(b) by 174 days.

(21) Appl. No.: 13/852,255

(22) Filed: Mar. 28, 2013

(65) Prior Publication Data
US 2014/0290137 A1     Oct. 2, 2014

(51) Int. Cl.
*A01G 31/00*     (2006.01)
*A01G 31/06*     (2006.01)

(52) U.S. Cl.
CPC ........................................ *A01G 31/06* (2013.01)

(58) Field of Classification Search
USPC .............. 47/62 R, 59 R, 63, 62 N, 79, 82, 67
See application file for complete search history.

(56) References Cited

U.S. PATENT DOCUMENTS

| | | | | | |
|---|---|---|---|---|---|
| 4,594,811 | A  * | 6/1986  | Tokoro    | ............................. | 47/65 |
| 5,251,399 | A  * | 10/1993 | Rasmussen | ...................... | 47/39 |
| 6,298,600 | B1 * | 10/2001 | Feldman   | .......................... | 47/67 |
| 6,470,625 | B1 * | 10/2002 | Byun      | ............................. | 47/82 |
| 8,418,403 | B1 * | 4/2013  | Nuttman   | .......................... | 47/82 |
| 8,720,836 | B2 * | 5/2014  | Hogan     | .......................... | 248/158 |
| 8,756,860 | B1 * | 6/2014  | Murphy    | ........................... | 47/47 |
| 2002/0189163 | A1 * | 12/2002 | Cooper | ........................... | 47/39 |

* cited by examiner

*Primary Examiner* — Kristen C Hayes
(74) *Attorney, Agent, or Firm* — Sand & Sebolt

(57) ABSTRACT

An indoor plant growing system and a method of using the same. The system includes a base defining an interior compartment, a mast extending upwardly from the base, a first arm extending outwardly from the mast, a cable hanging downwardly from the first arm, one or more pots engaged on the cable, and a water delivery system connecting a water supply and the uppermost pot. The water supply preferably is a reservoir disposed inside the base's compartment. A pump pushes water from the reservoir, through pipes and thereby delivers the same to the uppermost pot. Water drains from the uppermost pot through a hose to a pot disposed there below and so on down the group of pots. In each pot the plant is retained in a plant basket which is suspended within a shell in such a way the plant's roots are retained within water accumulated within the pot.

26 Claims, 10 Drawing Sheets

HYDROPONIC GROWING SYSTEM

BACKGROUND OF THE INVENTION

1. Technical Field

This invention relates generally to gardening. More particularly, this invention relates to a system for growing plants. Specifically, this invention is directed to a hydroponic growing system including a plurality of pots suspended one above the other on cables hanging downwardly from a frame; and including water and light delivery systems to speed the growth of the plants.

2. Background Information

Apartment dwellers and home owners in relatively harsh climates may have considerable issues when trying to grow plants, especially vegetables. There may be insufficient suitable outdoor space to grow plants or there may be too short a growing season to allow vegetables to grow and ripen.

There is therefore a need for a simplified, easy to use indoor growing system which is able to be used year round in relatively confined spaces.

SUMMARY

An indoor plant growing system and a method of using the same. The system includes a base defining an interior compartment, a mast extending upwardly from the base, a first arm extending outwardly from the mast, a cable hanging downwardly from the first arm, one or more pots engaged on the cable, and a water delivery system connecting a water supply and the uppermost pot. The water supply preferably is a reservoir disposed inside the base's compartment. A pump pushes water from the reservoir, through pipes and thereby delivers the same to the uppermost pot. Water drains from the uppermost pot through a hose to a pot disposed there below and so on down the group of pots. In each pot the plant is retained in a plant basket which is suspended within a shell in such a way the plant's roots are retained within water accumulated within the pot.

The growing system is a self-contained, indoor hydroponic plant growing system. While the system may be utilized for growing small herbs or flowers, it is primarily designed for growing vegetables indoors. The system is approximate 7'6" tall and can accommodate between twenty and twenty-four large plants at any time. This type of system could, conceivably, keep an apartment-sized family in fresh vegetables year round.

BRIEF DESCRIPTION OF THE SEVERAL VIEWS OF THE DRAWINGS

Preferred embodiments of the invention, illustrative of the best mode in which Applicant contemplates applying the principles, are set forth in the following description and are shown in the drawings and are particularly and distinctly pointed out and set forth in the appended claims.

Similar numbers refer to similar parts throughout the drawings.

DETAILED DESCRIPTION

Figure 2:
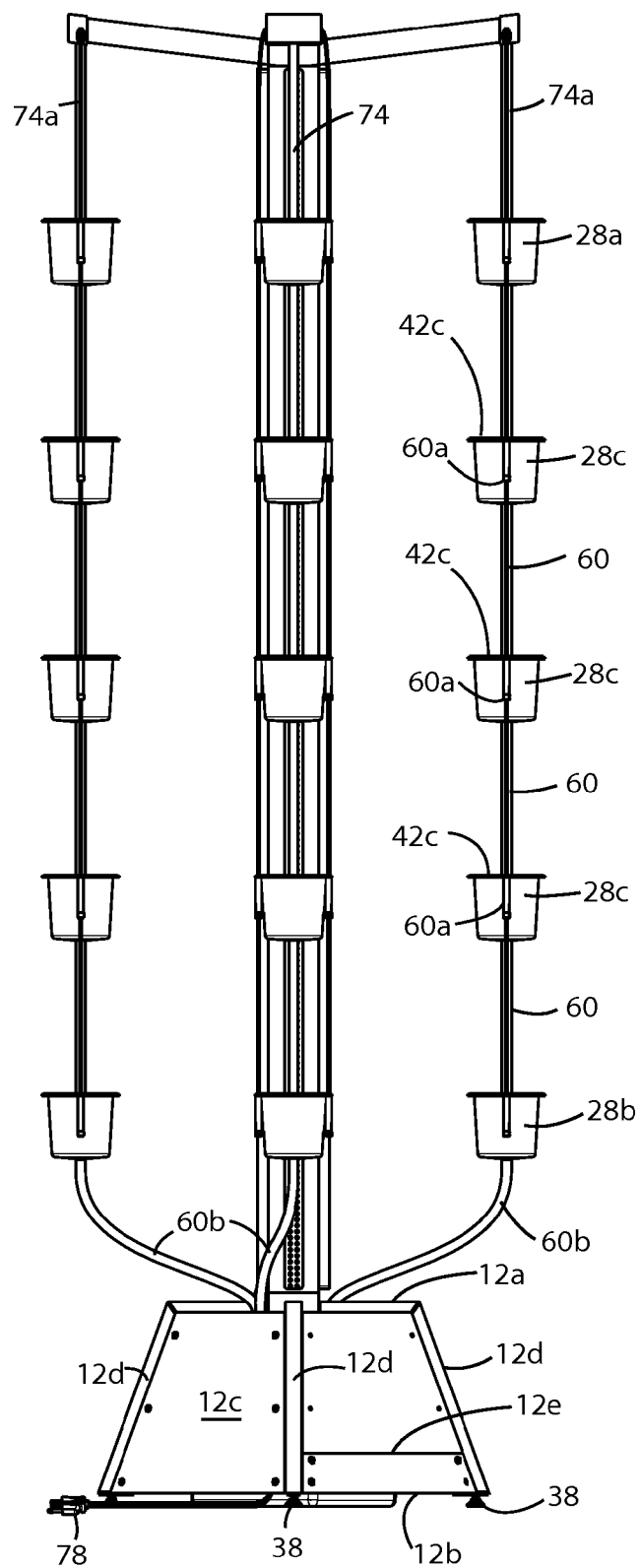
FIG. 2 is a side view of the gardening system.
Figure 3:
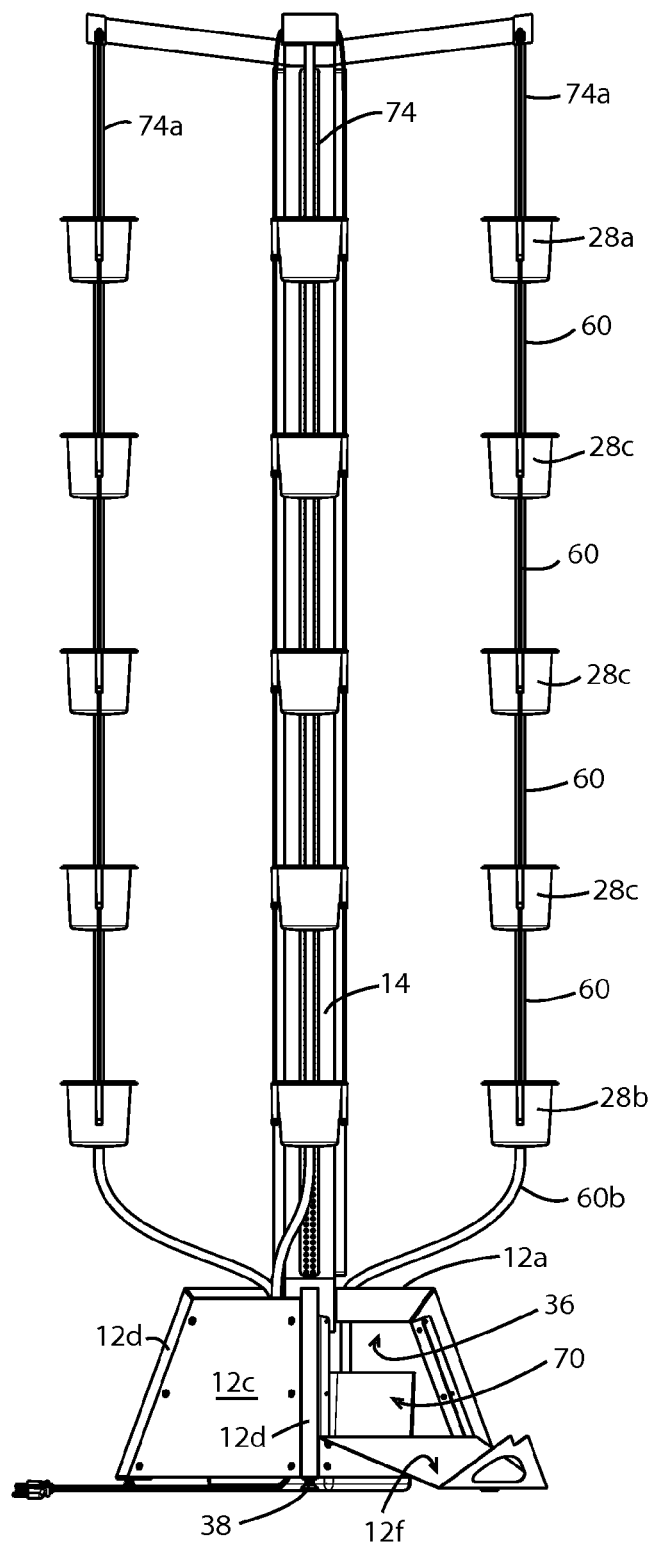
FIG. 3 is the side view of the gardening system with a door opened at the base.
Figure 4:
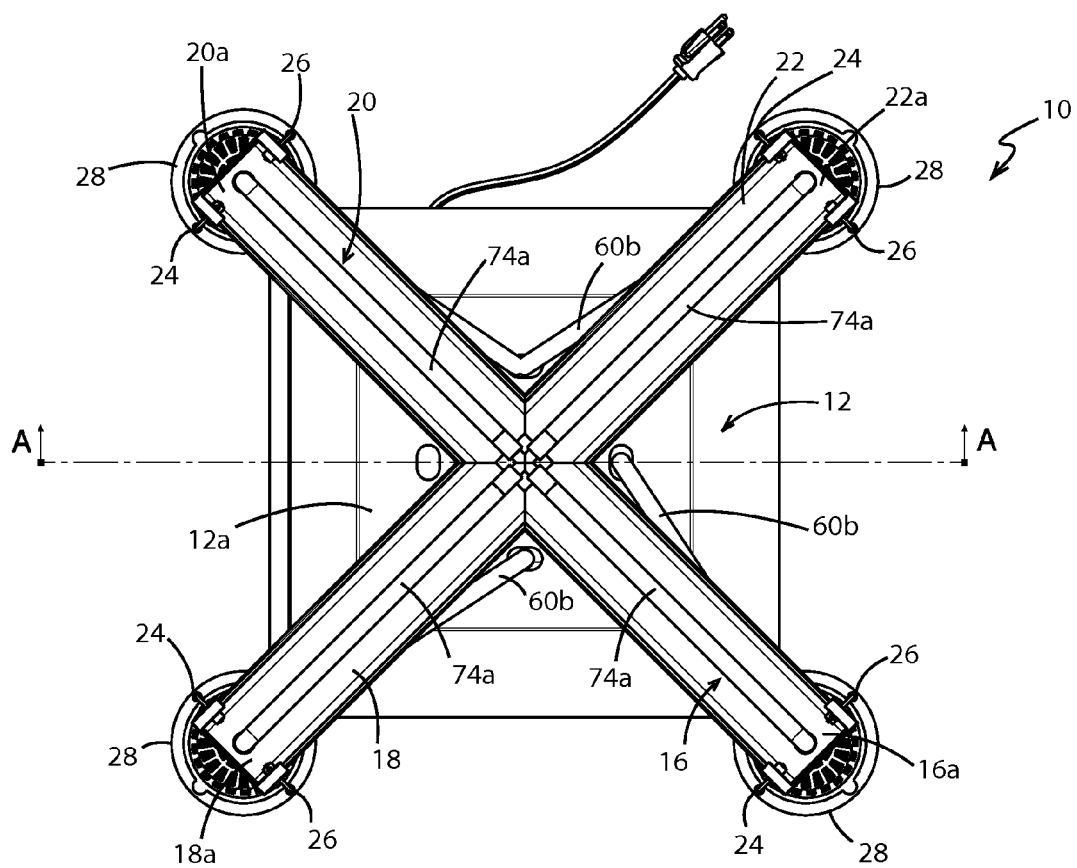
FIG. 4 is a top view of the gardening system.

Referring to FIGS. 1-10, there is shown a hydroponic growing system, generally indicated at 10. Growing system 10 includes a base 12, a mast 14 extending upwardly and outwardly from base 12, and at least one arm 16 extending outwardly from a top end 14a of mast 14. Preferably, four arms 16, 18, 20, 22 (FIG. 4) extend outwardly from top end 14a. FIG. 4 shows that arms 16, 18, 20, 22 are spaced substantially equidistantly from each other.

At least one and preferably two cables are secured to each arm 16, 18, 20, 22 and hang downwardly therefrom toward a surface upon which base 12 rests. At least one and preferably a plurality of pots 28 is secured to cables 24, 26. Each of the pots 28 is used to grow a plant 30 therein A water delivery system 32 is provided to deliver water to pots 28. Additionally, growing system 10 preferably is provided with a light delivery system 34 for illuminating plants 30 growing in pots 28. Both of these systems 32, 34 will be further described herein.

Figure 1:
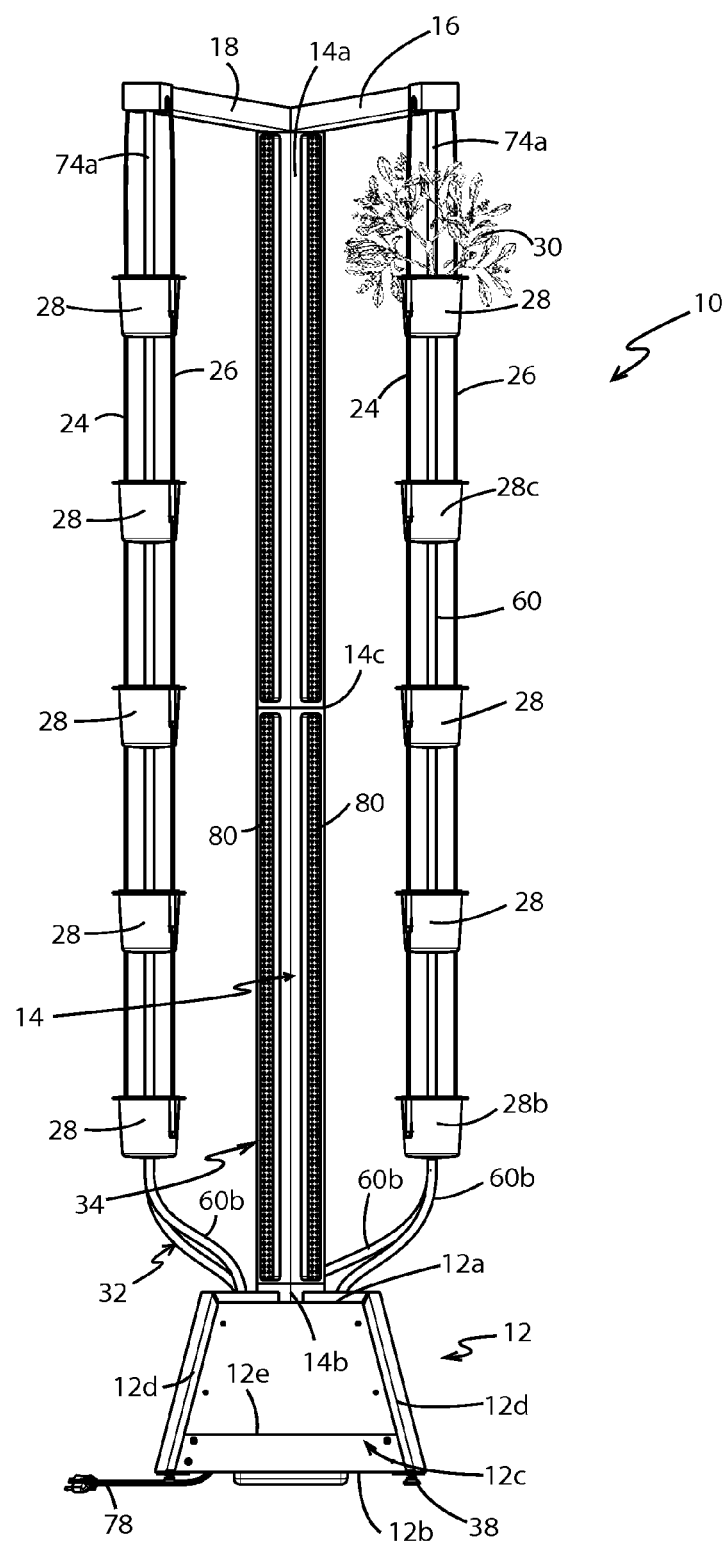
FIG. 1 is a front plan view of the hydroponic gardening system.

Referring still to FIGS. 1 and 2, base 12 includes a top wall 12a, bottom wall 12b and side walls 12c. Strengthening ribs 12d are disposed between adjacent side walls 12d. One of side walls 12c is divided into an upper and a lower section which are connected to each other by way of a hinge 12e. The upper section 12f is pivotable about hinge 12e as best seen in FIG. 3. Top wall 12a, bottom wall 12b and side walls 12c bound and define an interior compartment 36 (FIG. 3) which may be accessed when upper section 12f is pivoted into an open position. Upper section 12f thus comprises an access door in base 12. A plurality of feet 38 extend outwardly from bottom wall 12b. Feet 38 preferably are of the type which is adjustable, so as to enable growing system 10 to be leveled on a floor surface upon which base 12 stands.

Figure 5:
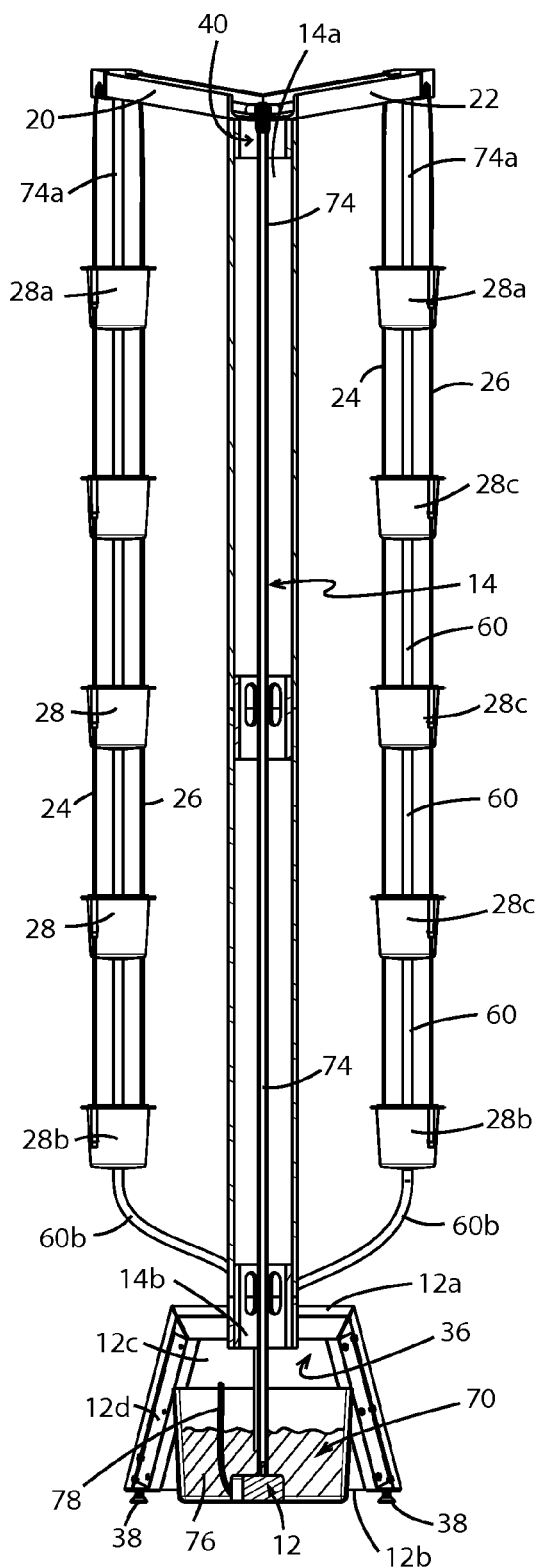
FIG. 5 is a cross-sectional side view taken along line 5-5 of FIG. 4.

As best seen in FIG. 5, mast 14 extends outwardly from top wall 12a of base 12. Mast 14 has a top end 14a and a bottom end 14b and preferably separates into upper and lower sections for shipping. Upper and lower sections are connected together in the central region 14c (FIG. 1). Bottom end 14b is fixedly secured within an aperture in top wall 12a of base. Both base 12 and mast 14 preferably are fabricated from a strong, rigid material. Suitable materials may include metal or a strong, rigid plastic. If base 12 and mast 14 are fabricated from metal, the two components may be welded together or secured by bolts or some other type of fastener. If the base 12 and mast 14 are fabricated from plastic, the components may be secured by suitable fasteners or by being complementary in configuration and being slotted together.

Growing system 10 includes a manifold of four arms 16, 18, 20, 22 radiating outwardly from top end 14a of mast 14. Arms 16-22 preferably are fabricated as a unitary component that includes a stem 40 which engages a top end 14a of mast 14. Stem 40 may be secured to top end 14a by suitable means. It is important that when base 12, mast 14 and arms 16-22 are assembled and the cables and pots are suspended therefrom, then entire growing system 10 is strong and stable as there will be a need for constantly tending and working with plants 30 retained therein. Preferably, the frame (i.e., base 12, mast 14, and arms 16-22) breaks down into the three separate components for the purpose of shipping growing system 10.

Cables 24, 26 are engaged with arms 16, 18, 20, 22. Preferably, cables 24, 26 are fabricated from a strong, rust-resistant material, such as stainless steel. Cables 24, 26 extend outwardly and downwardly from proximate the free ends 16a, 18a, 20a, 22a of the respective arms 16-22. Cables 24, 26 may be two individual members which are separately and independently engaged with the respective free end of one of the arms. Alternatively, a single cable may be engaged with each arm and two lengths of that single cable will hang downwardly from the arm as cable sections 24, 26. It will be understood that a single cable strand i.e. 24 or 26 could be used to suspend pots 28 therefrom if the single strand is placed in an appropriate location to balance the pots. Alternatively, more than two cables may be utilized for this purpose. Ideally, however, cables 24, 26 are disposed opposite each other and spaced apart so that pots 28 suspended therefrom are balanced and will not tend to tip over.

Figure 6:
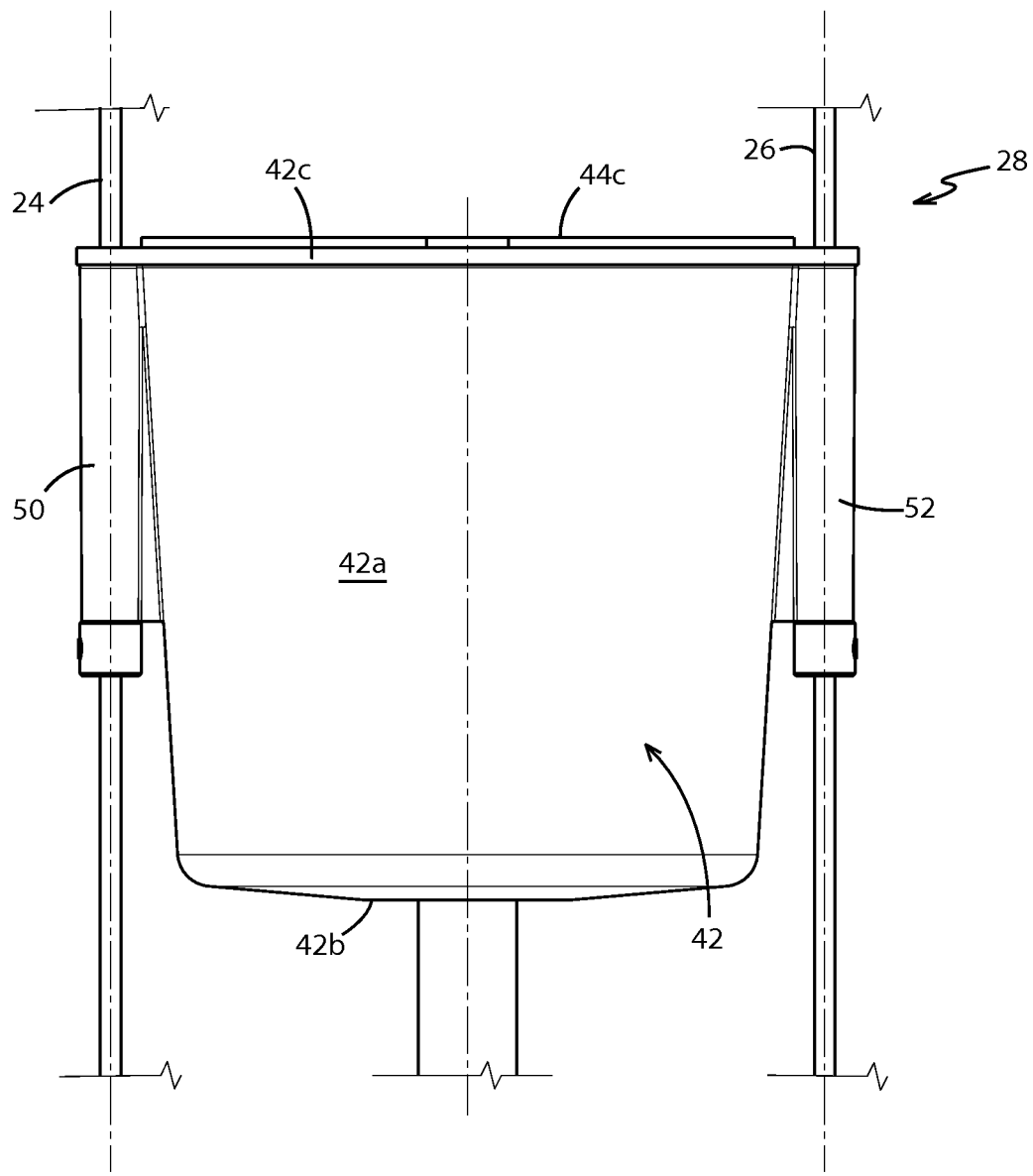
FIG. 6 is a side view of a single hanging pot used in the gardening system.
Figure 7:
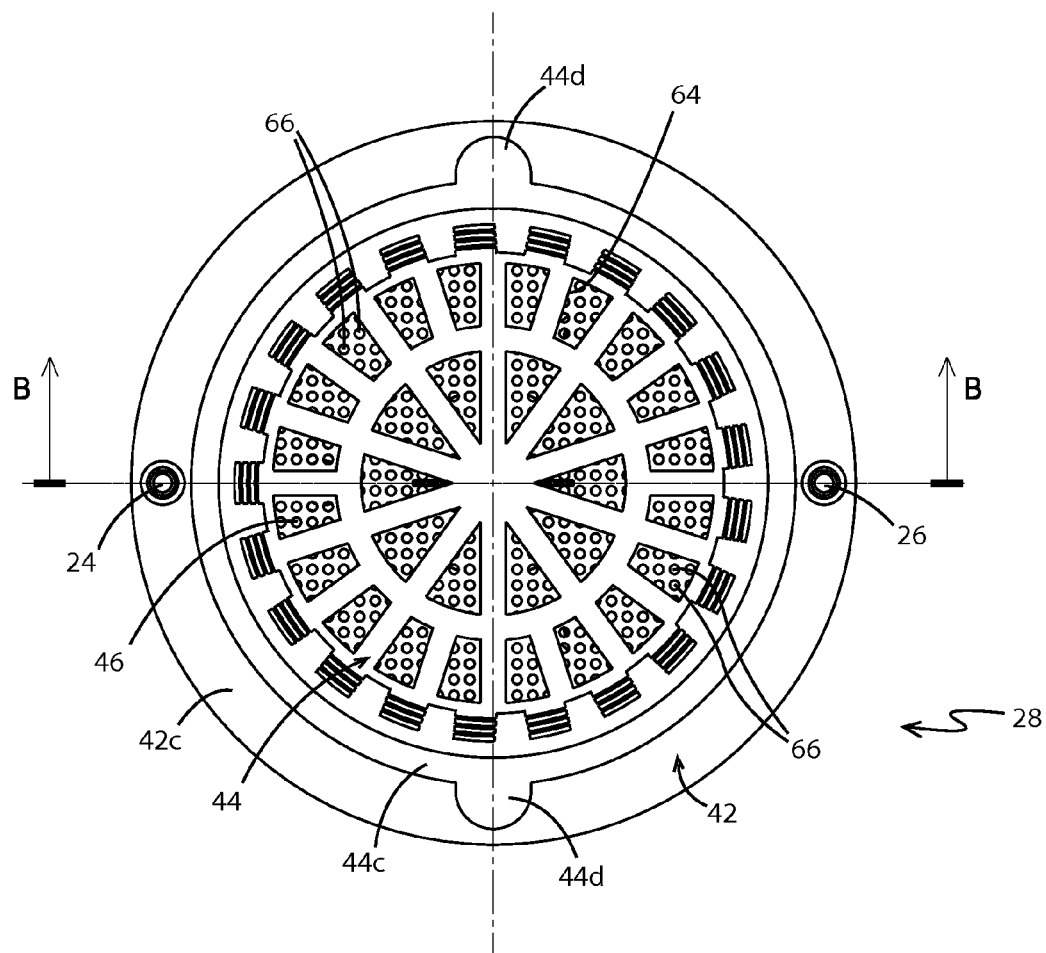
FIG. 7 is a top view of the single hanging pot of FIG. 6.
Figure 8:
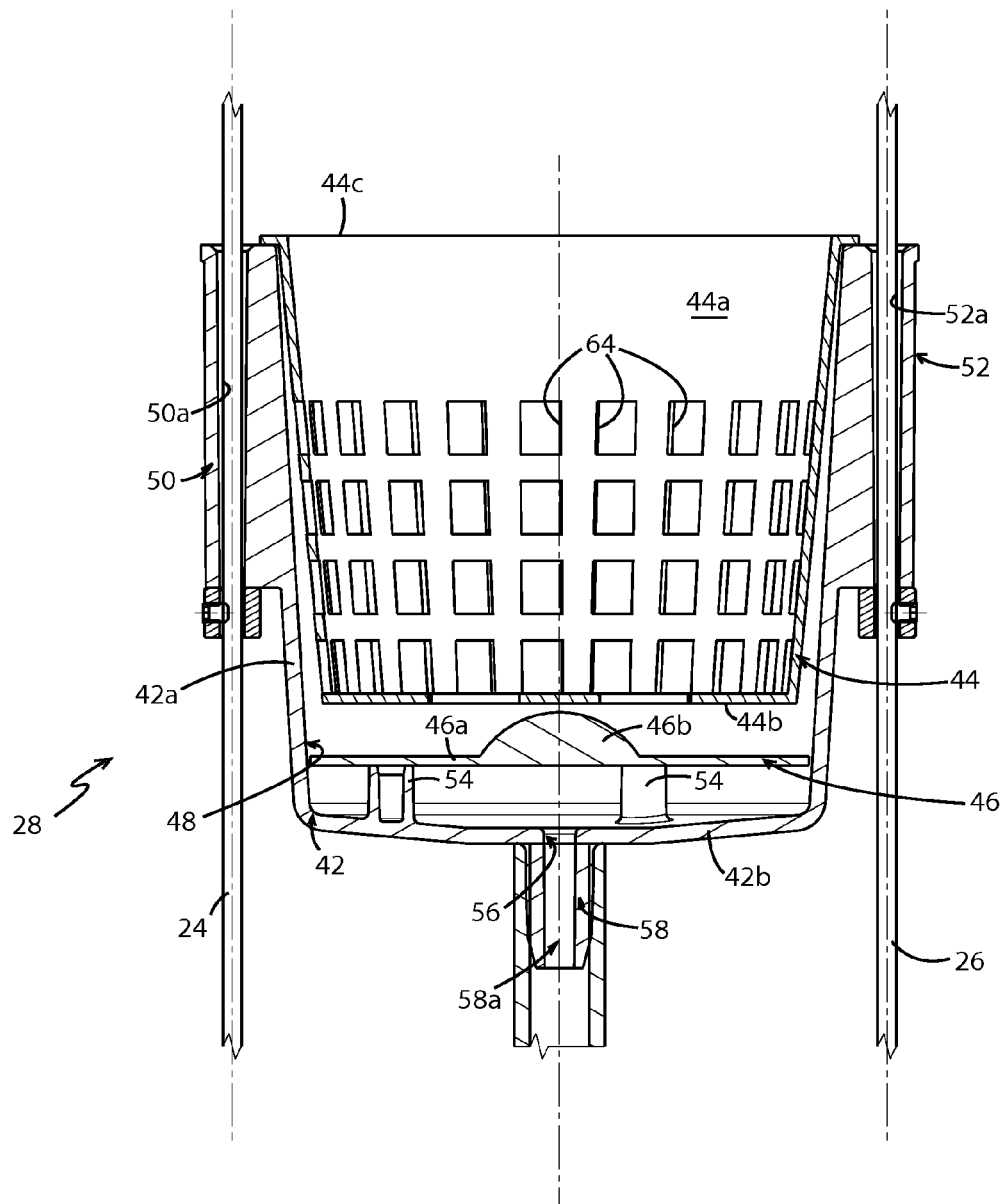
FIG. 8 is a cross-sectional side view of the hanging pot taken along line 8-8 of FIG. 7.
Figure 9:
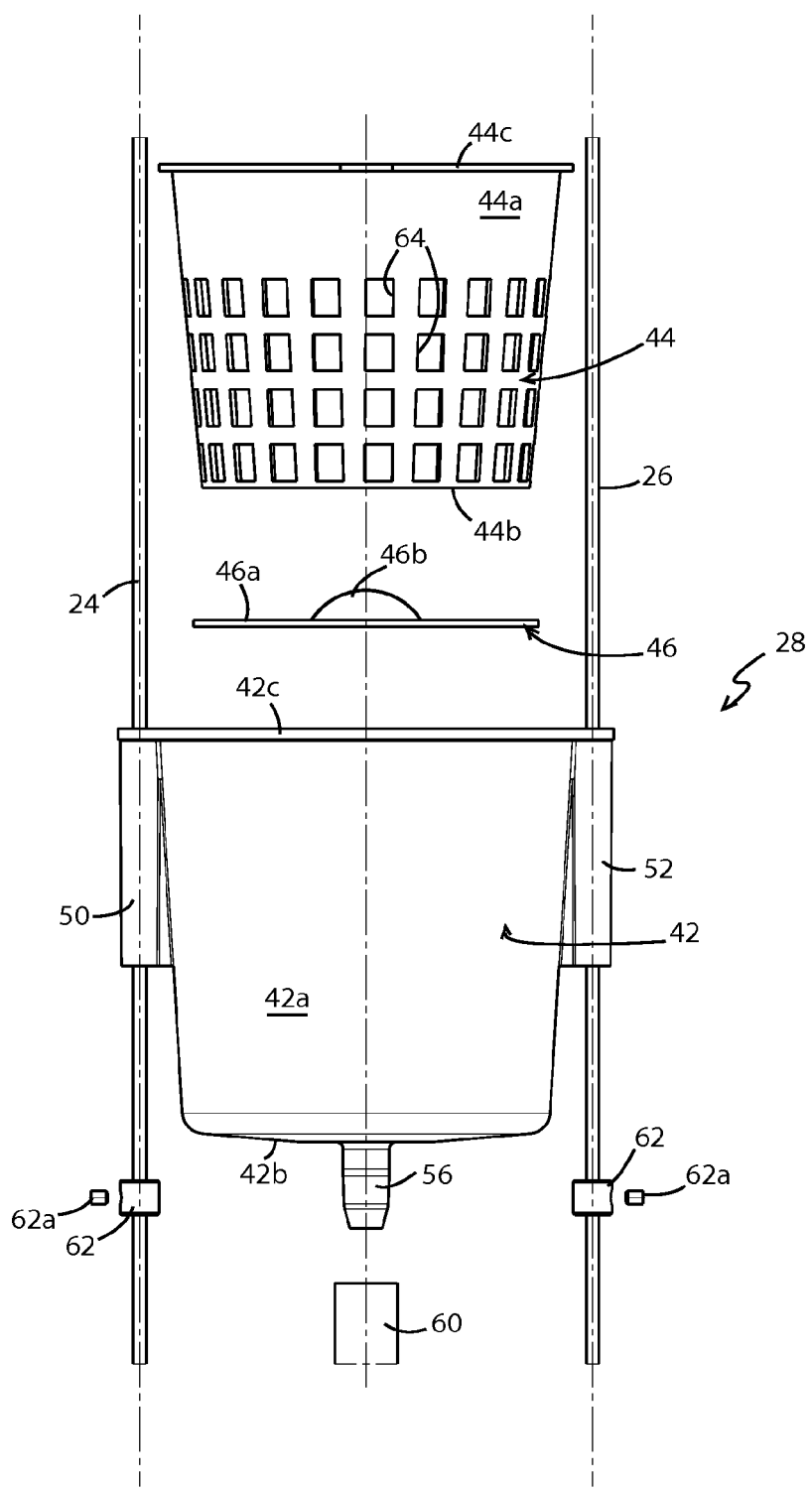
FIG. 9 is an exploded side view of the hanging pot.
Figure 10:
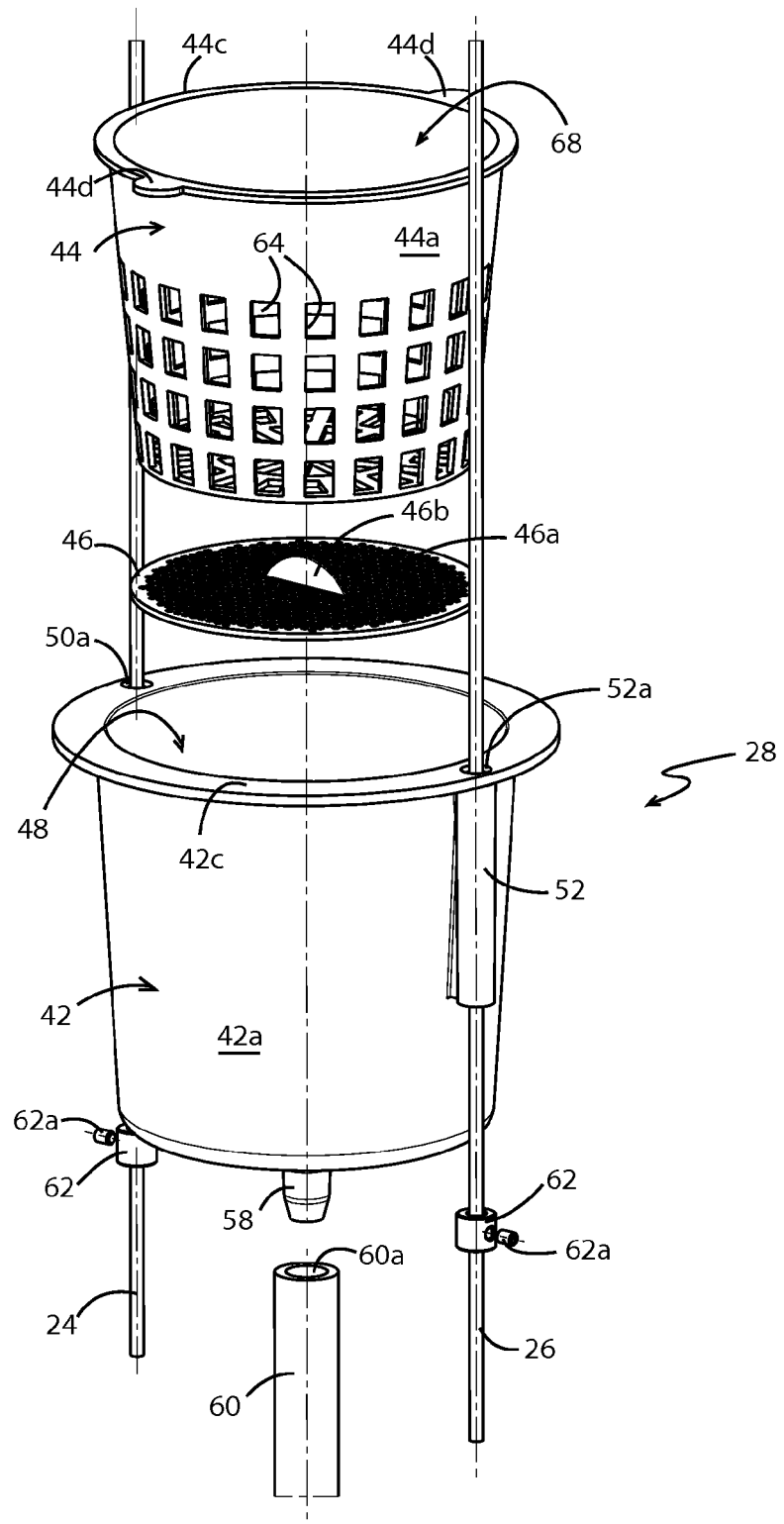
FIG. 10 is an exploded perspective view of the hanging pot.

Pots 28 are shown in greater detail in FIGS. 6-10. As best seen in FIGS. 9 and 10, each pot 28 comprises a shell 42, a plant basket 44, and a root screen 46. Shell 42 includes a peripheral wall 42a and a bottom wall 42b which bound and define a chamber 48. Peripheral wall 42a is generally cylindrical with the exception of a pair of opposing tubular bosses 50, 52 which are disposed vertically adjacent peripheral wall and extending generally from top edge 42c and toward bottom wall 42b. Each boss 50, 52 defines a channel 50a, 50b respectively (FIG. 8) and through which one of cables 24, 26 is received. Thus, as is illustrated in FIG. 8, cable 24 is received through channel 50a of boss 50 and cable 26 is received through channel 52a of boss 52. The channels 50a, 50b are substantially parallel to each other so that cables 24, 26 are retained generally parallel to each other, even though the peripheral wall 42a of shell 42 tapers from top edge 42c toward bottom wall 42b. This configuration aids in ensuring that pot 28 is unable to tip or invert even when subjected to the weight of a heavy plant being disposed therein.

Preferably, one or more detents 54 extend upwardly from an interior surface of bottom wall 42b and into chamber 48. These detents 54 ensure there will be a gap between interior surface of bottom wall 42b and root screen 46 when pot 28 is assembled.

Shell 42 further defines a drain opening 56 in bottom wall 42b. A drain pipe 58 extends outwardly from exterior surface of bottom wall 42b and is in fluid communication with drain opening 56. Drain opening 56 and therefore the bore 58a of drain pipe 58 are in fluid communication with chamber 48 in shell 42. Preferably, drain pipe 58 tapers toward its free end which is remote from bottom wall 42. A length of hose 60 is engaged with drain pipe 58, as will be later described herein. The free end of drain pipe 58 is received within bore 60a of hose 60 and the tapered shape of the free end enables this to be done relatively easily.

In order to retain shell 42 on cables 24, 26, at a desired distance relative to the arm 1622 from which cables 24, 26 hang, a cable stop 62 is engaged with each cable. Cable stop 62 is selectively movable along the length of the respective cable 24, 26 to the desired position and then a locking mechanism 62 on cable stop 62 is engaged to keep the stop at that position. Cable stops 62 are of a size that is greater than the channels 50a, 50b in bosses 50, 52. Thus, bosses 50, 52 are unable to move past cable stops 62 and shell 42 is thereby retained at the preset distance from the respective arm 16-22. Each of the plurality of pots 28 is suspended in this manner on cables 24, 26. Cable stops 62 make it possible to space pots 28 at any desired distance away from each other. Thus, if the gardener wishes to grow taller plants in pots 28, he or she will string fewer pots 28 on cables 24, 26 and will space them further apart, locking the pots in place with cable stops 62. For shorter plants, more pots 28 may be threaded onto cables 24, 26 and are moved therealong to position them closer to each other.

Referring still to FIGS. 6-10, plant basket 44 includes a generally cylindrical peripheral wall 44a, a bottom wall 44b and a top edge 44c. Top edge includes a pair of opposed lips 44d which can be grasped by the gardener to lift plant basket 44 out of the chamber 48 of shell 42. Lips 44d are best seen in FIGS. 7 and 10. Plant basket 44 is complementary in shape to shell 42 but is smaller than shell 42 so that a gap is defined between interior surface of shell 42 and exterior surface of basket 44, as can be seen in FIG. 8.

Plant basket 44 defines a plurality of openings 64 therein. Openings 64 preferably are defined in the lower two-thirds of peripheral wall 44a and in bottom wall 44b (FIG. 7). Openings 64 are of a sufficient size to permit the roots of a plant, such as plant 30 from FIG. 1, to extend therethrough and into the gap between plant basket 44 and shell 42.

Root screen 46 is disposed between bottom wall 44b of plant basket 42 and bottom wall 42b of shell 42. Preferably, root screen 46 is a plate-like disc 46a defining a plurality of apertures 66 therein. Apertures 66 are substantially smaller than openings 64 and are configured to allow water to flow therethrough. Openings 66 are small enough to substantially prevent roots from growing therethrough.

Root screen 46 further includes a spacer 46b which projects upwardly from an upper surface thereof and engages bottom wall 44b of plant basket 44. Spacer 46b ensures there is a gap for water to flow through between bottom wall 44b of plant basket 44 and bottom wall 42b of shell 42. Spacer 46b also supports bottom wall 44b of plant basket 44 and thereby the weight of any plant 30 retained in plant basket 44.

Peripheral wall 44a and bottom wall 44b of plant basket 44 bound and define a cavity 68 into which a plant, such as plant 30 is able to be received.

It will be understood that preferably all of the pots 28 on cables 24, 26 suspended from arms 16-22 are configured in the manner described above.

Growing system 10 further includes water delivery system 32. As best shown in FIG. 6, water delivery system 32 comprises a reservoir 70, a pump 72, and a plurality of water pipes 74. Reservoir 70 is retained within compartment 36 in base 12 and is therefore hidden from view. Reservoir 70 may take any suitable form and is configured to retain a quantity of water 76 therein. The gardener is able to top up reservoir 70 through access door 12f in base 12. Pump 72 is an immersed fountain pump which is placed so as to be able to push water 76 from reservoir 70 into a central pipe 74 which runs up mast 14. Pump 72 is connected to a power supply via an electric cord 78 which is able to plug into an electrical outlet (not shown). It will be understood that another power source, such as a battery, may, alternatively, be utilized to power pump 72.

Pipe 74 splits into four pipes 74a at top end 14a of mast 14. Each of the pipes 74a extends along one of the arms 16-22 (as shown in FIG. 4), and then extends downwardly to the uppermost pot 28a in one of the column of pots. A length of hose 60, as previously described, extends outwardly from the bottom of each pot 28 in the column and thereby forms an extension of pipe 74/74a. A length of hose 60b extends outwardly from the lowermost pot 28b in the column of pots. The four lengths of hose 60b are guided by mast 14 back downwardly and into reservoir 70. Thus, pump 72 pushes water upwardly through pipe 74 to top end 14a of mast 14 and then along arms 16-22, and through an uppermost section 74a into uppermost pot 28a (FIG. 5). Water delivered to the uppermost pot 28a initially collects in plant basket 44, then drains through openings 64 into the gap between bottom wall 44b and bottom wall 42b, and thus collects in shell 42. When a plant 30 in in uppermost pot 28a (FIG. 1), the roots of that plant 30 will be bathed in the water collected in the shell 42 thereof. The water will slowly drain out of shell 42 through drain opening 56, through drain pipe 58 and into hose 60. Water flows through hose 60 into the vertically adjacent and intermediate pot 28c disposed beneath uppermost pot 28a, where the process will be repeated. Water spillage is substantially prevented in growing system 10 because each hose 60 extends for a short distance below top edge 42c of shell 42 of the pot 28 immediately below. This is illustrated in FIG. 2 where it can be seen that the terminal end of each hose 60a is a distance downwardly from top edge 42c.

Water thus will flow from one intermediate pot 28c to the next until it flows into lowermost pot 28b. Any water remaining in pot 28b will drain through lowermost hose sections 60b and back into reservoir 70 to be recycled through system 10 by pump 72.

Finally, growing system 10 preferably also includes light delivery system 34 comprising lengths of a light bar 80 which are provided at intervals along the sides of mast 14. Preferably, each light bar 80 is provided in alignment with one of the arms 16-22. Light bars 80 extend from proximate bottom end 14b of mast 14 to proximate top end 14a thereof. Preferably, light bars 80 include pluralities of LEDs (Light Emitting Diodes). Light bars 80 will also be operatively connected, along with pump 72, to a power supply, preferably via electrical cord 78. It will be understood that instead of light bars 80 the LEDs may be applied to or form part of cables 24, 26 and may also be applied along the underside of arms 16-22.

Growing system 10 is used in the following manner to grow plant 30. The method includes;
positioning the plant 30 in a pot, such as pot 28a;
suspending pot 28a on a cable 24 some distance above a ground surface;
watering plant 30 in pot 28 using a water-delivery system 32.

The method further includes the step of providing illumination to plant 30 via light bars 80 disposed adjacent the suspended pot 28a.

The method further includes the step of positioning plant 30 in pot 28 by:
placing plant 30 in a plant basket 44 so that the roots of the plant extend outwardly therefrom;
lowering plant basket 44 into a shell 42 so that the roots thereof are disposed in a space between plant basket 44 and shell 42; and
applying water 76 via water-delivery system 32 into the space to surround the roots.

Still further, the method includes:
positioning a root screen 46 between a bottom wall 44b of plant basket 44 and bottom wall 42b of shell 42.

Still further, the method includes:
threading two cables 24, 26 through channels 50a, 52a disposed on a peripheral wall 42a of shell 42;
sliding the pot to a desired position along the lengths of the cables 24. 26; and
engaging a cable stop 62 to retain the pot at the desired position.

Finally, the method further includes:
suspending an additional pot 28c on the two cables 24, 26 at a position disposed a distance beneath the pot 28a;
draining water through a drain pipe 58 in the bottom wall of the pot; and
delivering the drained water through a hose 60 from drain pipe 58 into a plant basket 44 of the additional pot 28c, and watering a second plant (not shown) in second plant basket 44.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. An indoor plant growing system growing system comprising:
   a base defining an interior chamber;
   a mast extending upwardly and outwardly from the base;
   a first arm extending outwardly from the mast;
   a cable hanging downwardly from the first arm;
   a pot engaged on the cable,
   a water delivery system operatively connecting a water supply and the pot; wherein the water supply comprises:
      a water reservoir disposed within the chamber of the base; and
      a pipe system which extends from the water reservoir along the mast to the arm and then to the pot.

2. The growing system as defined in claim 1, further comprising:
   a pump operatively connecting the reservoir to the pipe system, said pump being activated to draw water from the reservoir and deliver that water to the pipe system.

3. The growing system as defined in claim 1, wherein the pot includes:
   a peripheral wall and a bottom wall;
   a chamber defined by the peripheral wall and bottom wall;
   an opening to the chamber defined in the peripheral opposite the bottom wall; and
   an aperture defined in the bottom wall opposite the opening.

4. The growing system as defined in claim 1, further comprising:
   a second arm extending outwardly from the mast opposite the first arm;
   a second cable hanging downwardly from the second arm;
   one or more pots engaged on the cable; and wherein the water delivery system is configured to connect the water supply to the second arm, and thereby to the one or more pots engaged with the second cable.

5. The growing system as defined in claim 4, further comprising:
   one or more additional arms extending outwardly from the mast; wherein the first arm, second arm, and one or more additional arms are spaced equidistantly around a circumference of the mast;
   a cable hanging downwardly from each of the one or more additional arms; and
   one or more pots engaged on the cable hanging downwardly from each of the one or more additional arms; and wherein the water delivery system is configured to deliver water to each of the one or more additional arms and thereby to the one or more pots which hang downwardly therebelow.

6. The growing system as defined in claim 1, wherein the pot further includes a plant cup configured to be received within the chamber defined by the pot's peripheral wall; and wherein the plant cup is adapted to receive a plant therein.

7. The growing system as defined in claim 6, wherein the plant cup includes a peripheral wall and a bottom wall, and a cavity defined by the peripheral wall and the bottom wall thereof; and the cavity is adapted to receive the plant therein; and wherein the plant cup further comprises a plurality of apertures defined in the peripheral wall and through which water is able to drain.

8. The growing system as defined in claim 6, further comprising a root screen configured to be disposed between the bottom wall of the pot and the bottom wall of the plant cup and to retain the bottom wall of the plant cup a spaced distance from the bottom wall of the pot.

9. The growing system as defined in claim 8, wherein the root screen defines a plurality of openings therein which permit water to pass therethrough but are of a size too small to permit roots to extend therethrough.

10. An indoor plant growing system comprising:
    a base defining an interior chamber;
    a mast extending upwardly and outwardly from the base;
    a first arm extending outwardly from the mast;
    a cable hanging downwardly from the first arm;
    a pot engaged on the cable, wherein the pot includes:
        a peripheral wall and a bottom wall;
        a chamber defined by the peripheral wall and bottom wall;
        an opening to the chamber defined in the peripheral opposite the bottom wall; and
        an aperture defined in the bottom wall opposite the opening;
    a water delivery system operatively connecting a water supply and the pot; and
    a hose engaged with the pot and extending downwardly from the aperture in the bottom wall.

11. The growing system as defined in claim 10, further comprising:
    a drain positioned adjacent the opening, and wherein water exits the chamber of the pot through the drain and travels downwardly into the hose through action of gravity.

12. The growing system as defined in claim 11, further comprising a plurality of substantially identical pots engaged at intervals along the cable; wherein said pots are vertically spaced from each other and the plurality of pots includes an uppermost pot, an intermediate pot and a lowermost pot.

13. The growing system as defined in claim 12, wherein the water delivery system is configured to deliver water to the uppermost pot and the water subsequently drains through a first hose extending from the uppermost pot to the intermediate pot.

14. The growing system as defined in claim 13, wherein the water delivery system is configured so that water delivered to the intermediate pot subsequently drains through a second hose extending from the intermediate pot and into the lowermost pot.

15. The growing system as defined in claim 14, wherein the water delivery system is configured so that water delivered to the lowermost pot subsequently drains through a third hose extending from the lowermost pot and returns to the water reservoir in the base.

16. The growing system as defined in claim 15, wherein water delivered to the uppermost pot via the pump returns to the reservoir under force of gravity.

17. The growing system as defined in claim 10, further comprising a second cable extending outwardly from the first arm a spaced distance from the first cable; and wherein the pot is engaged with each of the first and second cables and is suspended a distance below the first arm on the first and second cables.

18. The growing system as defined in claim 17, wherein the pot further comprises a pair of opposed channels defined on the peripheral wall; and wherein each of the first and second cables is received through one of the pair of channels.

19. The growing system as defined in claim 18, further comprising a pair of stops, each stop engaged with one of the first and second cables; and wherein each stop is positioned adjacent a bottom end of one of the channels in the pot.

20. An indoor plant growing system comprising a base defining an interior chamber;
    a mast extending upwardly and outwardly from the base;
    a first arm extending outwardly from the mast;
    a cable hanging downwardly from the first arm;
    a pot engaged on the cable;
    a water delivery system operatively connecting a water supply and the pot; and
    a lighting strip which extends along one or more of a portion of the mast, a portion of the arm, and a portion of the cable, said lighting strip being positioned to provide illumination to a plant growing in the pot.

21. A method of growing a plant comprising the steps of:
    providing an indoor plant growing system comprising a base defining an interior chamber, a mast extending upwardly and outwardly from the base, a first arm extending outwardly from the mast, one or more cables hanging downwardly from the first arm, a pot engaged on each of the one or more cables, a water delivery system operatively connecting a water supply and the pots wherein the water supply comprises a water reservoir disposed within the chamber of the base; and a pipe system which extends from the water reservoir along the mast to the arm and then to the pots;
    positioning a plant in each pot;
    suspending the pots on the cables some distance above a ground surface;
    watering the plants in the pots using the water-delivery system.

22. The method as defined in claim 21 further comprising the step of:
    providing illumination via light bars disposed adjacent the suspended pots.

23. The method as defined in claim 21, wherein the step of positioning the plant in the pot includes the steps of:
    placing the plant in a plant basket so that the roots extend outwardly therefrom;
    lowering the plant basket into a shell so that the roots thereof are disposed in a space between the plant basket and the shell; and
    applying water via the water-delivery system into the space to surround the roots.

24. The method as defined in claim 23, further comprising the steps of;
    positioning a root screen between a bottom wall of the plant basket and the bottom wall of the shell.

25. The method as defined in claim 23, further comprising the steps of:
    threading two cables through channels disposed on a peripheral wall of the shell;
    sliding the pot to a desired position along the lengths of the cables; and
    engaging a cable stop to retain the pot at the desired position.

26. The method as defined in claim 25, further comprising the steps of:
    suspending an additional pot on the two cables at a position disposed a distance beneath the pot;
    draining water through a drain pipe in the bottom wall of the pot; and delivering the drained water through a hose from the drain pipe into a plant basket of the additional pot; and watering a second plant in the second plant basket.

\* \* \* \* \*